United States Patent
Hill et al.

(10) Patent No.: US 11,994,054 B2
(45) Date of Patent: *May 28, 2024

(54) REDUCTANT TANK ASSEMBLY WITH MULTIPLE CONNECTION TANK HEADER

(71) Applicant: Cummins Emission Solutions Inc., Columbus, IN (US)

(72) Inventors: Joe V. Hill, Columbus, IN (US); Bolaji Suberu, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/132,675

(22) Filed: Apr. 10, 2023

(65) Prior Publication Data
US 2023/0243285 A1 Aug. 3, 2023

Related U.S. Application Data

(63) Continuation of application No. 17/497,127, filed on Oct. 8, 2021, now Pat. No. 11,674,424.

(51) Int. Cl.
*F01N 3/20* (2006.01)
*B01D 35/027* (2006.01)
(Continued)

(52) U.S. Cl.
CPC ......... *F01N 3/2066* (2013.01); *B01D 35/027* (2013.01); *B01D 53/9431* (2013.01);
(Continued)

(58) Field of Classification Search
CPC ........ F01N 3/025; F01N 3/0253; F01N 3/029; F01N 3/2033; F01N 3/206; F01N 3/2066; F01N 3/2073; F01N 3/208; F01N 3/36; F01N 3/108; F01N 3/0842; F01N 3/0293; F01N 3/0814; F01N 3/0871; F01N 3/0885; F01N 2430/04; F01N 2570/18; F01N 2610/00; F01N 2610/01; F01N 2610/02; F01N 2610/03; F01N 2610/04;
(Continued)

(56) References Cited

U.S. PATENT DOCUMENTS 9,387,438 B2 * 7/2016 Golin .................... F01N 3/2066
9,512,763 B2 12/2016 Hudgens et al.
(Continued)

FOREIGN PATENT DOCUMENTS

WO WO-2019/173323 A1 9/2019

*Primary Examiner* — Binh Q Tran
(74) *Attorney, Agent, or Firm* — Foley & Lardner LLP

(57) ABSTRACT

A header assembly for an aftertreatment system includes: a header including: a suction port, and a return port; a first splitting device configured to receive a first flow of reductant from the suction port and to split the first flow into a first inlet flow and a second inlet flow; a second splitting device configured to receive a first outlet flow and a second outlet flow and to provide a second flow to the return port of the header; a first inlet line configured to direct the first inlet flow to a first dosing module; a second inlet line configured to direct the second outlet flow to a second dosing module; a first outlet line configured to direct the first outlet flow to the second splitting device; and a second outlet line configured to direct the second outlet flow to the second splitting device.

10 Claims, 6 Drawing Sheets

(51) Int. Cl.
  *B01D 53/94* (2006.01)
  *F01P 3/20* (2006.01)

(52) U.S. Cl.
  CPC .......... *F01P 3/20* (2013.01); *B01D 2201/204* (2013.01); *F01N 2610/10* (2013.01); *F01N 2610/1406* (2013.01); *F01N 2610/1426* (2013.01); *F01N 2610/1433* (2013.01); *F01N 2900/18* (2013.01); *F01N 2900/1806* (2013.01); *F01P 2060/00* (2013.01)

(58) Field of Classification Search
  CPC ............. F01N 2610/05; F01N 2610/06; F01N 2610/10; F01N 2610/1426; F01N 2610/1433; F01N 2610/102; F01N 2610/1453; F01N 2610/1402; F01N 2610/146; F01N 2900/1404; F01N 2610/1406; F01N 2610/1413; F01N 2610/142; F01N 2900/18; F01N 2900/1806; B01D 35/023; B01D 35/027; B01D 53/9431; B01D 2201/204; B01D 2251/206; B01D 2251/2062; B01D 2251/2067; B60K 13/04; B60K 15/03; B60K 2015/016; B60K 15/04; B60K 2015/03335; B60K 2015/0458; B60K 2015/0461; B60K 2015/0464; B60K 2015/0467; B60K 15/0474; B60K 15/03519; B60K 2015/03552; F01P 3/20; F01P 2060/00; F01P 3/12; F01P 2060/16
  See application file for complete search history.

(56) References Cited

U.S. PATENT DOCUMENTS

| | | | |
|---|---|---|---|
| 9,650,932 B2 | 5/2017 | Cassidy et al. | |
| 10,202,883 B2* | 2/2019 | Yang | F01N 3/28 |
| 10,634,034 B2* | 4/2020 | Fan | F01N 3/021 |
| 10,830,120 B2* | 11/2020 | Sekine | F01N 3/2896 |
| 11,674,424 B2* | 6/2023 | Hill | B01D 35/027 |
| | | | 60/320 |
| 2010/0319651 A1 | 12/2010 | Kasahara | |
| 2014/0369899 A1* | 12/2014 | Fahrenkrug | F01N 3/2066 |
| | | | 422/173 |
| 2015/0023843 A1 | 1/2015 | Driscoll et al. | |
| 2015/0052878 A1* | 2/2015 | Qi | F01N 13/0093 |
| | | | 60/287 |
| 2016/0053643 A1* | 2/2016 | Fan | F01N 3/0233 |
| | | | 60/297 |
| 2017/0350290 A1 | 12/2017 | Yang et al. | |
| 2019/0178130 A1* | 6/2019 | DeHart | B01D 53/9418 |

* cited by examiner

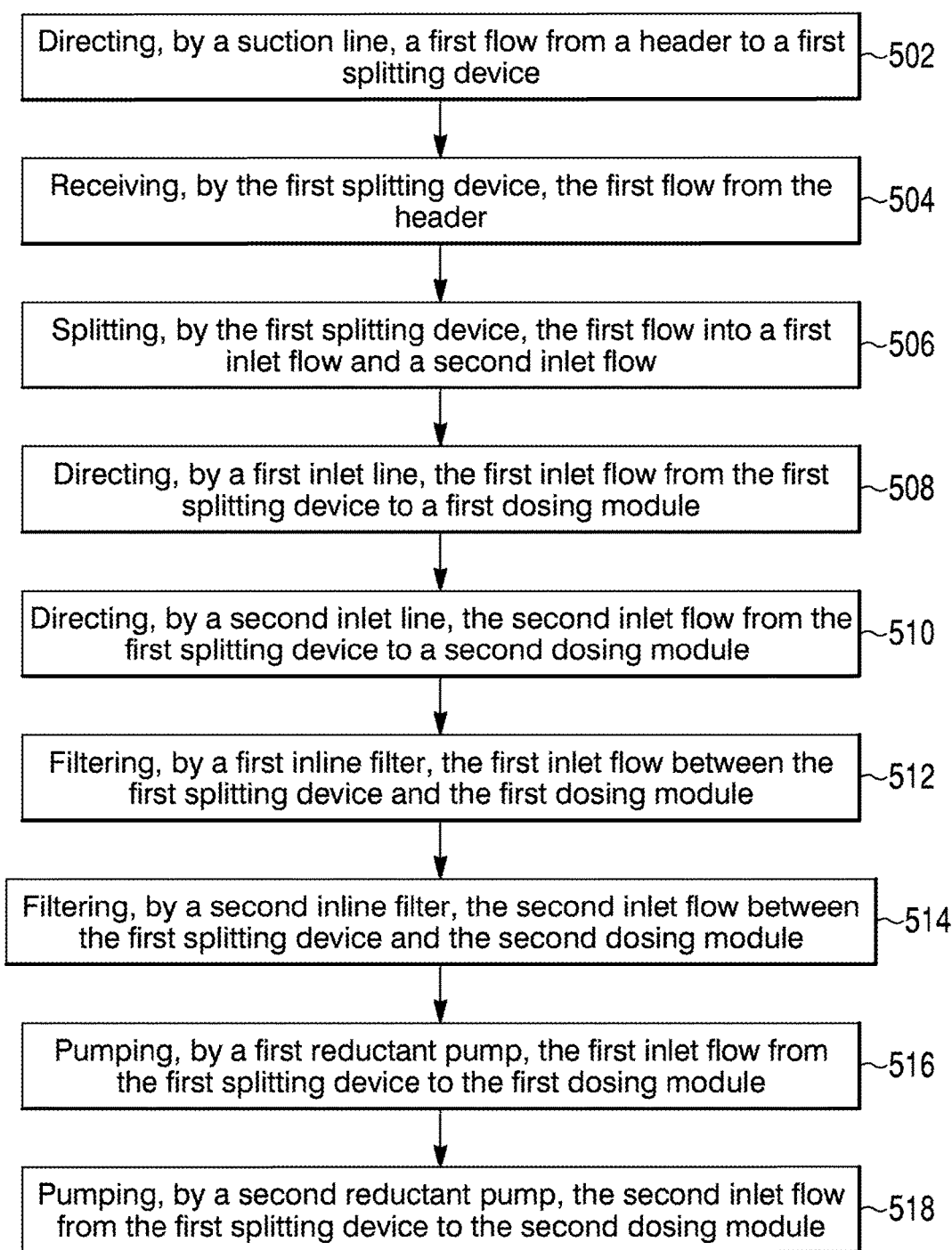

REDUCTANT TANK ASSEMBLY WITH MULTIPLE CONNECTION TANK HEADER

CROSS-REFERENCE TO RELATED APPLICATION

The present application is a continuation of U.S. patent application Ser. No. 17/497,127, filed Oct. 8, 2021, the contents of which are hereby incorporated by reference in their entirety

TECHNICAL FIELD

The present disclosure relates generally to aftertreatment systems for an internal combustion engine, header assemblies, reductant tank assemblies, and a method of using such systems and assemblies.

BACKGROUND

In an internal combustion engine system, it may be desirable to treat exhaust gas produced by combustion of fuel by an internal combustion engine. The exhaust gas can be treated using an aftertreatment system in which a doser injects reductant into the exhaust gas to reduce undesirable components in the exhaust gas. In large aftertreatment systems or in vehicles with multiple aftertreatment systems, it may desirable to treat the exhaust gas with multiple dosing modules. However, multiple dosing modules typically require either a separate reductant tank for each dosing module or multiple headers on a single reductant tank.

SUMMARY

In one embodiment, a header assembly for an aftertreatment system includes: a header configured to be coupled to a reductant tank, the header comprising a suction port and a return port; a first splitting device configured to receive a first flow of reductant from the header and to split the first flow into a first inlet flow and a second inlet flow; a second splitting device configured to receive a first outlet flow and a second outlet flow and to provide a second flow to the header, a first inlet line coupled to the first splitting device and configured to direct the first inlet flow from the first splitting device to a first dosing module, a second inlet line coupled to the first splitting device and configured to direct the second outlet flow from the first splitting device to a second dosing module; a first outlet line coupled to the second splitting device and configured to direct the first outlet flow from the first dosing module to the second splitting device; and a second outlet line coupled to the second splitting device and configured to direct the second outlet flow from the second dosing module to the second splitting device.

In another embodiment, the aftertreatment system includes a first dosing module configured to insert a reductant to treat an exhaust gas; a second dosing module configured to insert the reductant to treat the exhaust gas; and a reductant tank assembly. The reductant tank assembly includes a reductant tank configured to contain the reductant, a header coupled to the reductant tank, a first splitting device configured to receive a first flow of reductant from the header and to split the first flow into a first inlet flow and a second inlet flow, a second splitting device configured to receive a first outlet flow and a second outlet flow and to provide a second flow to the header, a first inlet line coupled to the first splitting device and the first dosing module and configured to direct the first inlet flow from the first splitting device to the first dosing module, a second inlet line coupled to the first splitting device and the second dosing module and configured to direct the second inlet flow from the first splitting device to the second dosing module, a first outlet line coupled to the second splitting device and the first dosing module and configured to direct the first outlet flow from the first dosing module to the second splitting device, and a second outlet line coupled to the second splitting device and the second dosing module and configured to direct the second outlet flow from the second dosing module to the second splitting device.

Another embodiment provides a method of using a reductant tank assembly to insert a reductant in an aftertreatment system having a first dosing module, a second dosing module, a reductant tank assembly including a reductant tank, a header coupled to the reductant tank, a first splitting device, a second splitting device, a first inlet line, a second inlet line, a first outlet line, and a second outlet line. The method includes receiving, by the first splitting device, a first flow from the header; splitting, by the first splitting device, the first flow into a first inlet flow and a second inlet flow; directing, by the first inlet line, the first inlet flow from the first splitting device to the first dosing module; directing, by the second inlet line, the second inlet flow from the first splitting device to the second dosing module; directing, by the first outlet line, a first outlet flow from the first dosing module to the second splitting device; directing, by the second outlet line, a second outlet flow from the second dosing module to the second splitting device; receiving, by the second splitting device, the first outlet flow and the second outlet flow; and providing, by the second splitting device, a second flow to the header.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

DETAILED DESCRIPTION

Following below are more detailed descriptions of various concepts related to, and implementations of, methods, apparatuses, and for providing a header assembly for an aftertreatment system. The various concepts introduced above and discussed in greater detail below may be implemented in any of a number of ways, as the described concepts are not limited to any particular manner of implementation.

Examples of specific implementations and applications are provided primarily for illustrative purposes.

I. Overview

Implementations described herein are related to an aftertreatment system with a first dosing module, a second dosing module, and a reductant tank assembly. The reductant tank assembly includes a reductant tank and a header coupled to the reductant tank. The header includes a suction port and a return port. A suction line containing a first flow and a return line containing a second flow pass through the suction port and the return port, respectively. The suction line is coupled to a first splitting device, which splits the first flow into a first inlet flow and a second inlet flow. The first dosing module receives the first inlet flow via a first inlet line, and the second dosing module receives the second inlet flow via a second inlet line. In this way, a single reductant tank with a single header can be used with multiple dosing modules. After the exhaust gas has been treated, the first inlet flow exits the first dosing module as a first outlet flow, and the second inlet flow exits the second dosing module as a second outlet flow. The first outlet flow and the second outlet flow return to the reductant tank via a first outlet line and a second outlet line, respectively. The first outlet line and the second outlet line are coupled to a second splitting device. The second splitting device merges the first outlet flow and the second outlet flow into a second flow. A return line coupled to the second splitting device receives the second flow from the second splitting device and directs the second flow through the return port and back into the reductant tank.

II. Overview of Example Aftertreatment Systems

Figure 1:
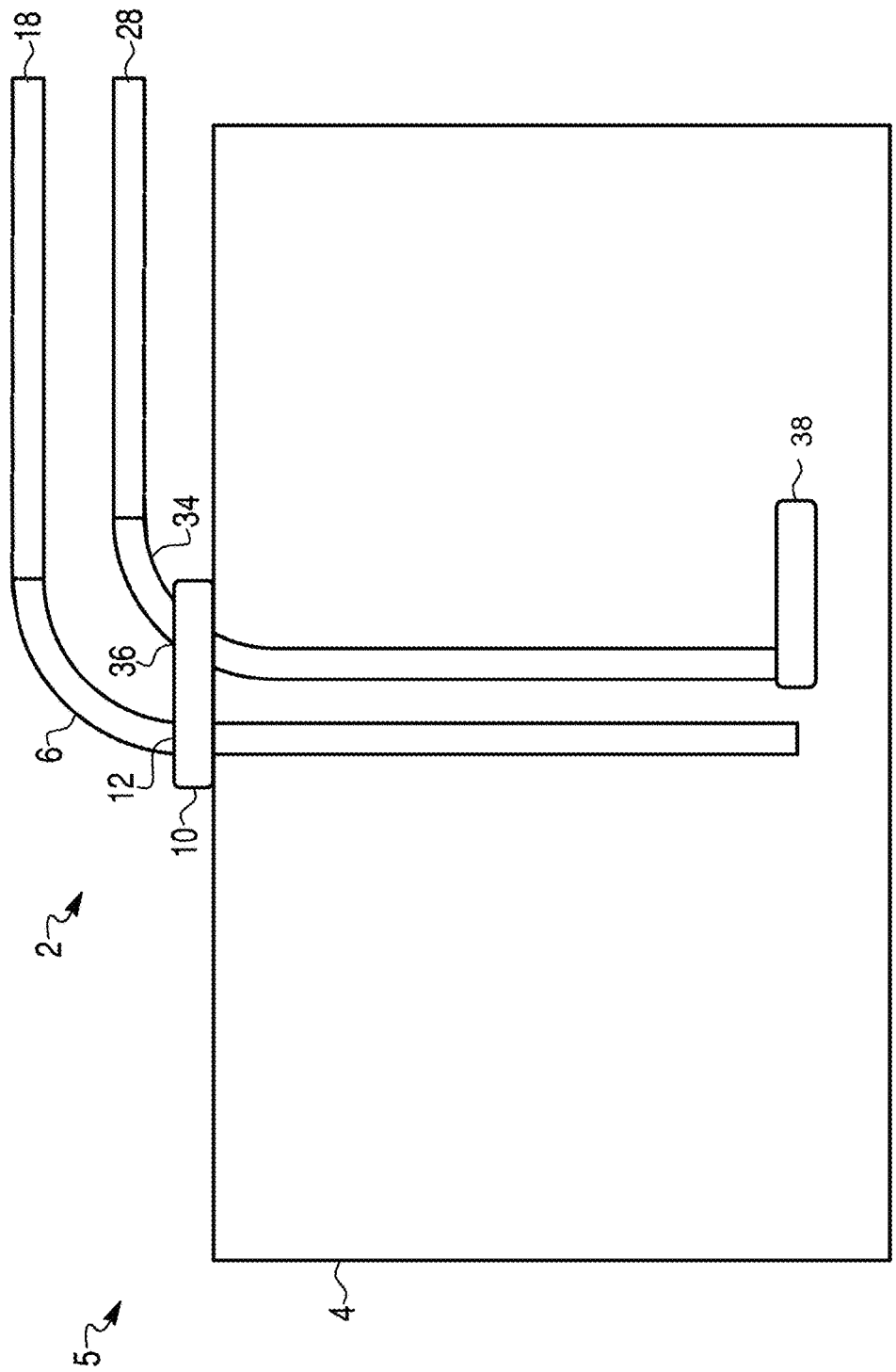
FIG. 1 is a schematic diagram showing a known header assembly for an aftertreatment system coupled to a reductant tank and single dosing module.

FIG. 1 depicts a known header assembly 2 for an aftertreatment system that includes a single dosing module. The header assembly 2 is configured to provide reductant (e.g., treatment fluid, etc.) to the dosing module, which doses reductant into exhaust gas. When the reductant is dosed into the exhaust gas, reduction of emission of undesirable components in the exhaust gas may be facilitated.

The header assembly 2 includes a reductant tank 4 configured to hold reductant, and a header 10 coupled (e.g., attached, fixed, welded, fastened, riveted, adhesively attached, bonded, pinned, etc.) to the reductant tank 4. When the header assembly 2 is coupled to the reductant tank 4, the header assembly 2 and the reductant tank 4 form a reductant tank assembly 5.

The header 10 includes a suction port 12 (e.g., an opening) through which reductant is sucked from the reductant tank 4, and a return port 36 (e.g., an opening) through which reductant is returned to the reductant tank 4. The header assembly 2 further includes a suction line 6 and a return line 34. The suction line 6 is coupled to the suction port 12 and configured to direct a first flow of reductant from the reductant tank 4 to an inlet line 18 of the dosing module. The suction line 6 includes an internal portion 6a disposed within the reductant tank 4 and an external portion 6b disposed outside the reductant tank 4. The return line 34 is coupled to the return port 36 and configured to direct a second flow of the reductant from an outlet line 28 of the dosing module to the reductant tank 4. The return line 34 includes an internal portion 34a disposed within the reductant tank 4 and an external portion 34b disposed outside the reductant tank 4. In the embodiment depicted in FIG. 1, the suction line 6 passes through the suction port 12 such that an end of the suction line 6 is disposed within the reductant tank 4, and the return line 34 passes through the return port 36 such that an end of the return line 34 is disposed within the reductant tank 4. In some embodiments, the suction line 6 include a reductant tank filter 38 disposed on the end of the suction line 6 to filter reductant before being directed to the suction line 6.

The header assembly 2 is for use with a single dosing module. In large aftertreatment systems or in vehicles with multiple aftertreatment systems, it may desirable to treat the exhaust gas with multiple dosing modules. However, multiple dosing systems typically require either a separate reductant tank 4 for each dosing system or multiple headers 10 on a single reductant tank 4.

The present application relates to an aftertreatment system 100 for treating exhaust gas produced by an internal combustion engine (e.g., diesel internal combustion engine, gasoline internal combustion engine, hybrid internal combustion engine, propane internal combustion engine, dual-fuel internal combustion engine, etc.) with a header assembly 102. As explained in more detail herein, the header assembly 102 allows for multiple dosing systems to be connected to a single tank and tank header rather than requiring multiple headers and/or multiple tanks, thereby making the aftertreatment system 100 more desirable than other systems. One embodiment of the header assembly 102 is shown in FIG. 2.

Figure 2:
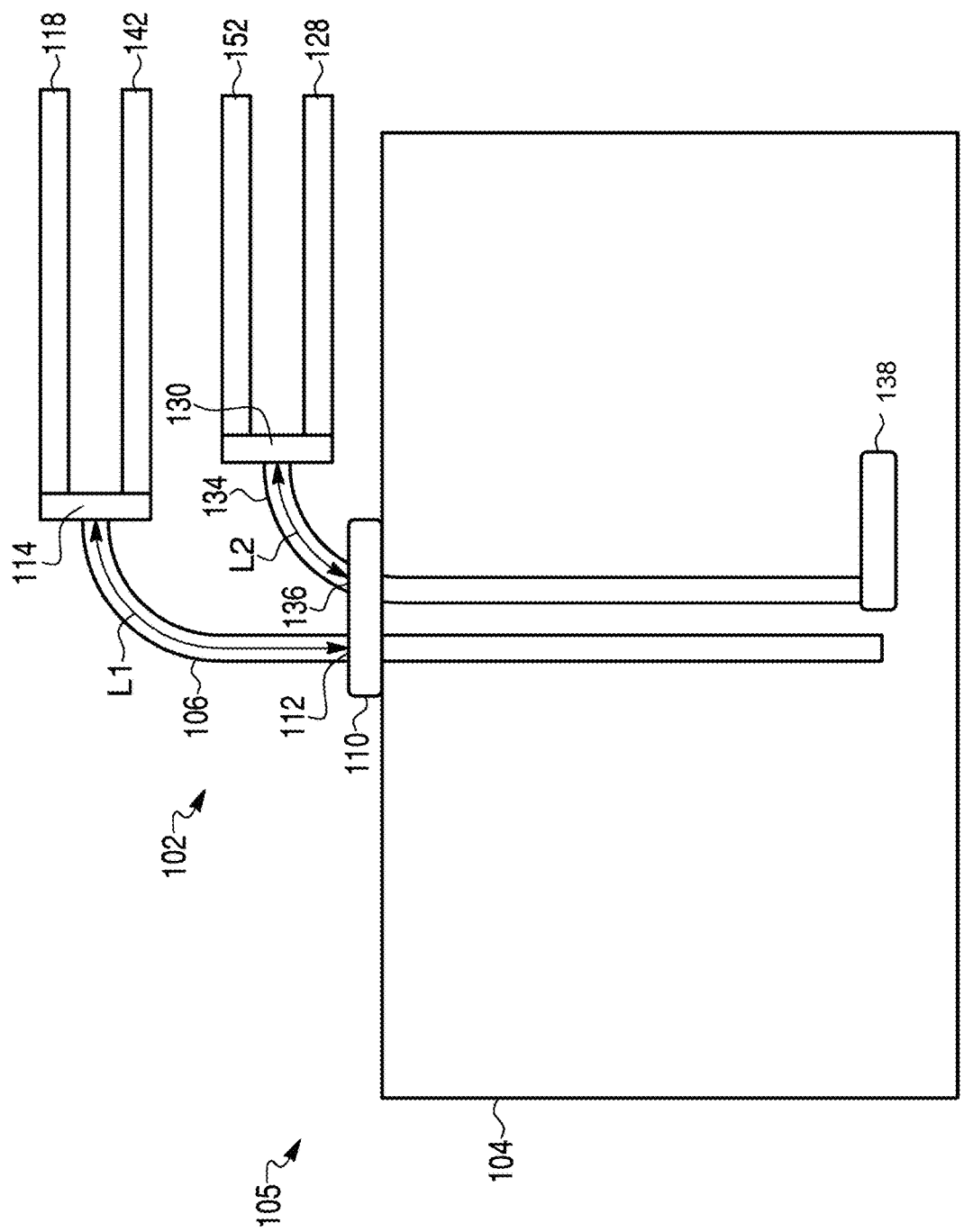
FIG. 2 is a schematic diagram showing a header assembly coupled to a reductant tank, a first splitting device, and a second splitting device, according to an exemplary embodiment of the invention.

FIG. 2 depicts a schematic diagram showing the header assembly 102, according to an exemplary embodiment of the invention. The header assembly 102 is configured to facilitate the introduction of a reductant (e.g., treatment fluid, etc.) into the exhaust gas. When the reductant is introduced into the exhaust gas, reduction of emission of undesirable components in the exhaust gas may be facilitated. In some embodiments, the header assembly 102 includes a reductant tank 104 (e.g., treatment fluid source, hydrocarbon tank, etc.). The reductant tank 104 is configured to contain the reductant. The reductant tank 104 may be, for example, a diesel exhaust fluid tank containing Adblue®. In some embodiments, the header assembly 102 is coupled to the reductant tank 104. When the header assembly 102 is coupled to the reductant tank 104, the header assembly 102 and the reductant tank 104 form the reductant tank assembly 105.

Referring to FIG. 2, in some embodiments, the header assembly 102 includes a suction line 106 (e.g., pipe, tube, etc.). The suction line 106 is configured to direct a first flow (e.g., of reductant, etc.) out of the reductant tank 104. In some embodiments, the suction line 106 includes an internal portion 106a and an external portion 106b. The internal portion 106a is disposed within the reductant tank 104 whereas the external portion 106b is disposed outside the reductant tank 104. The header assembly 102 also includes a header 110. The header 110 is configured to be coupled (e.g., attached, fixed, welded, fastened, riveted, adhesively attached, bonded, pinned, etc.) to the reductant tank 104 and secures the suction line 106 and other components that facilitate the passage of reductant in and out of the reductant tank 104, as described in more detail herein. The header 110 includes a suction port 112 (e.g., opening, etc.). The suction line 106 is coupled to the suction port 112 and passes through the suction port 112 such that an end of the suction line 106 is disposed within the reductant tank 104. In this way, the suction line 106 is able to direct the first flow out of the reductant tank 104. In some embodiments, the internal portion 106a of the suction line 106 is coupled to the external portion 106b of the suction line 106 at the suction port 112. In some embodiments, the suction line 106 includes a reductant tank filter coupled to the suction line 106 and disposed within the reductant tank 104. In this way, the reductant tank filter 138 may inhibit or prevent the transmission of solids to the header assembly 102.

Referring to FIG. 2, in some embodiments, the header assembly 102 includes a first splitting device 114 (e.g., splitter, T-fitting, etc.). The first splitting device 114 is coupled to the suction line 106, and in some embodiments, the external portion 106b of the suction line 106 is coupled to the first splitting device 114. The first splitting device 114 is configured to receive the first flow from the suction line 106 and split the first flow into more than one flow of reductant. In this way, the header assembly 102 may provide multiple flows of reductant from the reductant tank 104 to multiple dosing systems. However, it should be noted that in some embodiments, only a single flow of reductant may flow through the system. In some embodiments, the first splitting device 114 is directly connected to the suction port 112. In other embodiments, the first splitting device 114 is located in the header 110. Further, in other embodiments, a first distance L1 between the header 110 and the first splitting device 114 is approximately in a range of 10 millimeters (mm) to 100 mm, inclusive (e.g., 7.5 mm, 10 mm, 15 mm, 25 mm, 75 mm, 95 mm, 100 mm, 105 mm, etc.). Preferably, the first distance L1 is approximately in a range of 25 mm to 75 mm, inclusive (e.g., 20 mm, 25 mm, 30 mm, 50 mm, 70 mm, 75 mm, 80 mm, etc.). As used herein, a range of X to Y includes X, Y, values between X and Y, and values approximately equal to X and approximately equal to Y.

As shown in FIG. 2, in some embodiments, the first splitting device 114 splits the first flow into a first inlet flow (e.g., of reductant, etc.). The following discussion includes a description of an exemplary embodiment of the aftertreatment system 100 with the header assembly 102 as the first inlet flow flows though the aftertreatment system 100.

Figure 3:
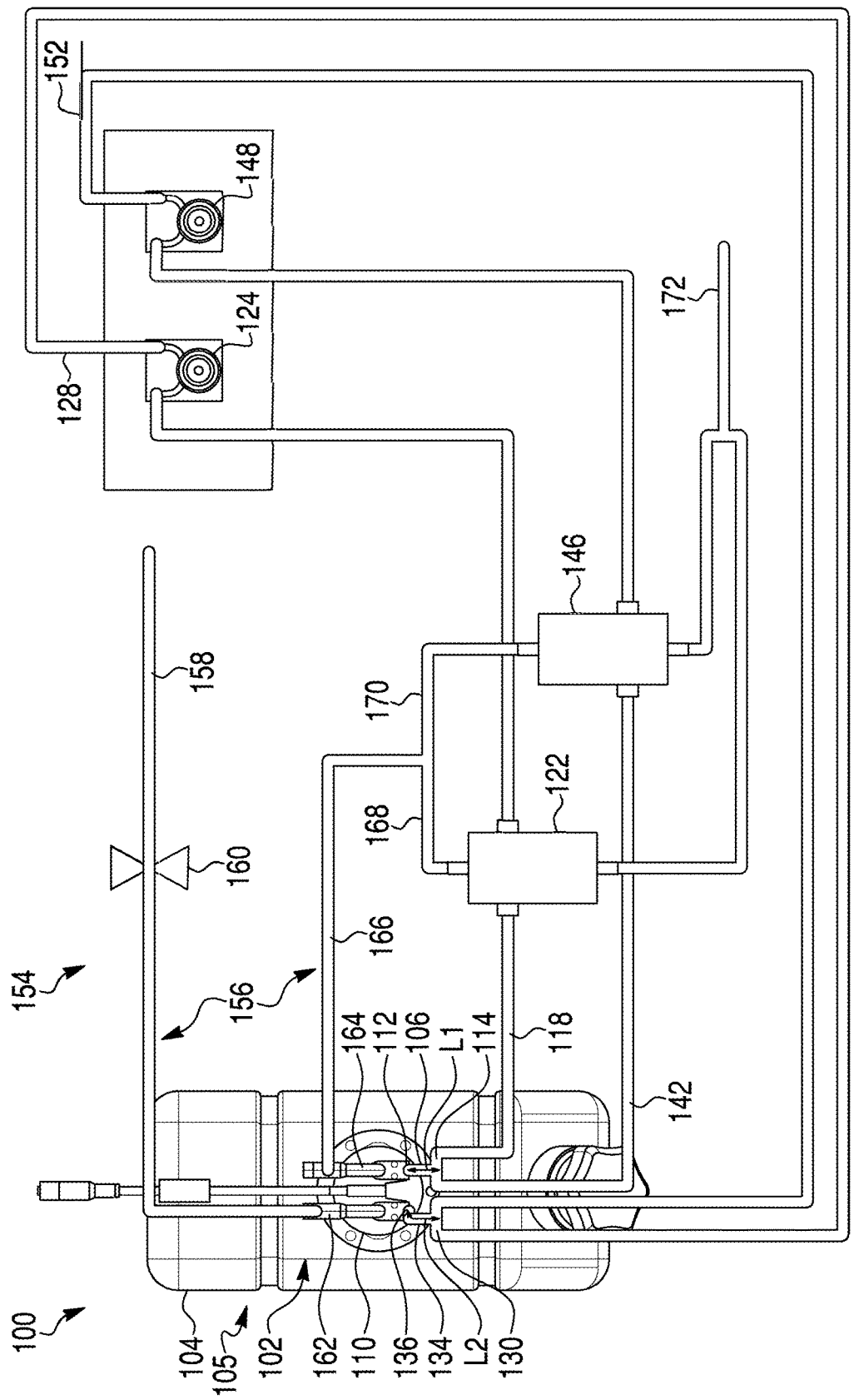
FIG. 3 is a schematic diagram showing an example aftertreatment system including a header assembly, according to an exemplary embodiment of the invention.

As shown in FIG. 2, in some embodiments, the header assembly 102 includes a first inlet line 118 (e.g., pipe, line, etc.). The first inlet line 118 directs the first inlet flow away from the first splitting device 114 and to downstream components of the aftertreatment system 100. FIG. 3 depicts a schematic diagram showing an example aftertreatment system 100 including a header assembly 102, according to an exemplary embodiment of the invention. As shown in FIG. 3, in some embodiments, the aftertreatment system 100 includes a first reductant pump 122 (e.g., reductant pump, etc.). The first reductant pump 122 is coupled to the first inlet line 118 and is configured to receive the first inlet flow from the first inlet line 118 and to pump the first inlet flow from the first splitting device 114 to downstream components of the aftertreatment system 100. The first reductant pump 122 may also be used to pressurize the first inlet flow for delivery to downstream components. In some embodiments, the first reductant pump 122 is pressure controlled. Additionally, the first reductant pump 122 may include a first non-return valve (e.g., one-way valve, check valve, etc.). The first non-return valve prevents back flow of the first inlet flow, particularly where only the first inlet flow is being used to treat the exhaust gas. In some embodiments, the first reductant pump 122 is coupled to a chassis of a vehicle associated with the aftertreatment system 100. After the first inlet flow passes through the first reductant pump 122, the first inlet flow continues downstream through the first inlet line 118.

Figure 4:
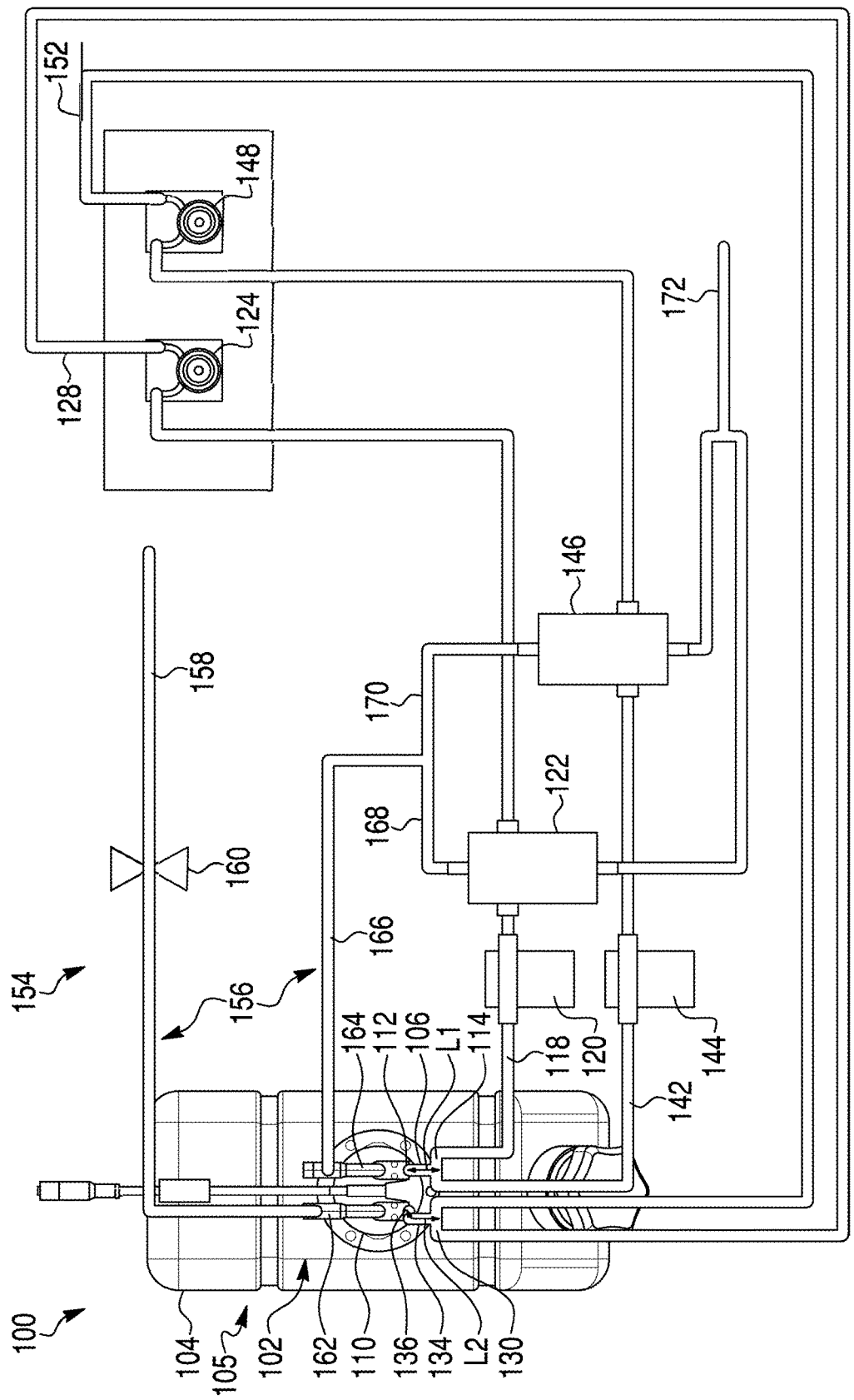
FIG. 4 is a schematic diagram showing an example aftertreatment system including a header assembly including a first inline filter and a second inline filter, according to an exemplary embodiment of the invention.

Referring to FIGS. 3 and 4, in some embodiments, the aftertreatment system 100 includes a first dosing module 124 (e.g., doser, reductant doser, etc.). The first dosing module 124 is downstream of the first reductant pump 122 and receives the first inlet flow from the first inlet line 118. The first dosing module 124 is configured to insert (e.g., dose, inject, etc.) the first inlet flow to facilitate treatment of the exhaust gas. By treating the exhaust gas with the first inlet flow, the first inlet flow facilitates the reduction of emission of undesirable components in the exhaust gas. For example, the first inlet flow may facilitate the decomposition of components of the exhaust via catalytic reactions. Specifically, the first inlet flow inserted into the exhaust gas may undergo the processes of evaporation, thermolysis, and hydrolysis to form non-NOx emissions by accelerating a NOx reduction process between the reductant and the NOx of the exhaust gas into diatomic nitrogen, water, and/or carbon dioxide. In some embodiments, the first dosing module 124, rather than the first reductant pump 122, includes the first non-return valve to prevent backflow of the first inlet flow.

After the first inlet flow has been injected by the first dosing module 124 and has treated the exhaust gas, the first inlet flow exits the first dosing module 124 as a first outlet flow (e.g., of reductant, etc.). In some embodiments, the header assembly 102 includes a first outlet line 128 (e.g., pipe, line, etc.). The first outlet line 128 is fluidly coupled to the first dosing module 124 and is configured to direct the first outlet flow from the first dosing module 124 to downstream components of the aftertreatment system 100.

Referring to FIGS. 2 and 3, in some embodiments, the header assembly 102 includes a second splitting device 130 (e.g., splitter, T-fitting, etc.). The second splitting device 130 is coupled to the first outlet line 128 and is configured to receive the first outlet flow from the first outlet line 128. When the second splitting device 130 receives the first outlet flow, the second splitting device 130 merges the first outlet flow into a second flow (e.g., of reductant, etc.). The header assembly 102 also includes a return line 134 (e.g., pipe, line, etc.). The return line 134 is coupled to the second splitting device 130 and is configured to direct the second flow from the second splitting device 130 to the reductant tank 104. In some embodiments, the return line 134 includes an internal portion 134a and an external portion 134b. The internal portion 134a is disposed within the reductant tank 104 whereas the external portion 134b is disposed outside the reductant tank 104. In some embodiments, the external portion 134b of the return line 134 is coupled to the second splitting device 130. In some embodiments, the header 110 includes a return port 136 (e.g., opening, etc.). The return line 134 is coupled to the return port 136 and passes through the return port 136 such that an end of the return line 134 is disposed within the reductant tank 104. In some embodiments, the external portion 134b of the return line 134 is coupled to the internal portion 134a of the return line 134 at the return port 136. In this way, the return line 134 directs the second flow from the second splitting device 130 into the reductant tank 104. In some embodiments, the second splitting device 130 is directly connected to the return port 136. In other embodiments, the second splitting device 130 is located in the header 110. Further, in other embodiments, a second distance L2 between the header 110 and the second splitting device 130 is approximately in a range of 10 millimeters (mm) to 100 mm, inclusive (e.g., 7.5 mm, 10 mm, 15 mm, 25 mm, 75 mm, 95 mm, 100 mm, 105 mm, etc.). Preferably, the second distance L2 is approximately in a range of 25 mm to 75 mm, inclusive (e.g., 20 mm, 25 mm, 30 mm, 50 mm, 70 mm, 75 mm, 80 mm, etc.).

Referring to FIG. 4, in some embodiments, the aftertreatment system 100 includes a first inline filter 120 (e.g., reductant filter, etc.). The first inline filter 120 is coupled to the first inlet line 118 and is configured to filter the first inlet low. The first inline filter 120 is disposed between the first splitting device 114 and the first reductant pump 122. The first inline filter 120 receives the first inlet flow from the first inlet line 118 and filters the first inlet flow before the first inlet flow reaches the first reductant pump 122. The first inline filter 120 may inhibit or prevent the transmission of solids to the first reductant pump 122. In this way, the first inline filter 120 may facilitate prolonged desirable operation of the first reductant pump 122.

As previously described, in some embodiments, the header assembly 102 includes the first splitting device 114. As shown in FIG. 2, in some embodiments, the first splitting device 114 also splits the first flow into a second inlet flow (e.g. of reductant, etc.). In this way, the header assembly 102 provides both the first inlet flow and the second inlet flow to treat the exhaust gas. The following discussion includes a description of an exemplary embodiment of the aftertreatment system 100 with the header assembly 102 as the second inlet flow flows though the aftertreatment system 100.

Referring to FIG. 2, in some embodiments, the header assembly 102 includes a second inlet line 142 (e.g., pipe, line, etc.). The second inlet line 142 directs the second inlet flow away from the first splitting device 114 and to downstream components of the aftertreatment system 100. Referring to FIG. 3, the aftertreatment system 100 includes a second reductant pump 146 (e.g. reductant pump, etc.). The second reductant pump 146 is coupled to the second inlet line 142 and is configured to receive the second inlet flow from the second inlet line 142 and to pump the second inlet flow from the first splitting device 114 to downstream components of the aftertreatment system 100. The second reductant pump 146 may also be used to pressurize the second inlet flow for delivery to downstream components. In some embodiments, the second reductant pump 146 is pressure controlled. Additionally, the second reductant pump 146 may include a second non-return valve (e.g. one-way valve, check valve, etc.). The second non-return valve prevents back flow of the second inlet flow, particularly where only the second inlet flow is being used to treat the exhaust gas. In some embodiments, the second reductant pump 146 is coupled to a chassis of a vehicle associated with the aftertreatment system 100. After the second inlet flow 140 passes through the second reductant pump 146, the second inlet flow continues downstream through the second inlet line 142.

Referring to FIG. 3, in some embodiments, the aftertreatment system 100 includes a second dosing module 148 (e.g., doser, reductant doser, etc.). The second dosing module 148 is downstream of the second reductant pump 146 and receives the second inlet flow from the second inlet line 142. The second dosing module 148 is configured to insert (e.g., dose, inject, etc.) the second inlet flow to facilitate treatment of the exhaust gas. By treating the exhaust gas with the second inlet flow, the second inlet flow facilitates the reduction of emission of undesirable components in the exhaust gas. For example, the second inlet flow may facilitate the decomposition of components of the exhaust via catalytic reactions. Specifically, the second inlet flow inserted into the exhaust gas may undergo the processes of evaporation, thermolysis, and hydrolysis to form non-NOx emissions by accelerating a NOx reduction process between the reductant and the NOx of the exhaust gas into diatomic nitrogen, water, and/or carbon dioxide. In some embodiments, the second dosing module 148 includes the second non-return valve, rather than the second reductant pump 146, to prevent backflow of the second inlet flow.

After the second inlet flow has been injected by the second dosing module 148 and has treated the exhaust gas, the second inlet flow exits the second dosing module 148 as a second outlet flow (e.g., of reductant, etc.). In some embodiments, the header assembly 102 includes a second outlet line 152 (e.g., pipe, line, etc.). The second outlet line 152 is coupled to the second dosing module 148 and is configured to direct the second outlet flow from the second dosing module 148 to downstream components of the aftertreatment system 100.

Referring to FIGS. 2 and 3, in some embodiments, the header assembly 102 includes the second splitting device 130. The second splitting device 130 is coupled to the second outlet line 152 and is configured to receive the second outlet flow 150 from the second outlet line 152. When the second splitting device 130 receives the second outlet flow, the second splitting device 130 merges the second outlet flow 150 with the first outlet flow 126 into the second flow 132. As previously discussed, the header assembly 102 also includes the return line 134 (e.g., pipe, line, etc.). The return line 134 is coupled to the second splitting device 130 and is configured to direct the second flow from the second splitting device 130 to the reductant tank 104. In some embodiments, the header 110 includes a return port 136 (e.g., opening, etc.). The return line 134 is coupled to the return port 136 and passes through the return port 136 such that an end of the return line 134 is disposed within the reductant tank 104. In this way, the return line 134 directs the second flow from the second splitting device 130 into the reductant tank 104. In some embodiments, the second splitting device 130 is directly connected to the return port 136. In other embodiments, the second splitting device 130 is located in the header 110. Further, in other embodiments, a second distance L2 between the header 110 and the second splitting device 130 is approximately in a range of 10 millimeters (mm) to 100 mm, inclusive (e.g., 7.5 mm, 10 mm, 15 mm, 25 mm, 75 mm, 95 mm, 100 mm, 105 mm, etc.). Preferably, the second distance L2 is approximately in a range of 25 mm to 75 mm, inclusive (e.g., 20 mm, 25 mm, 30 mm, 50 mm, 70 mm, 75 mm, 80 mm, etc.). Referring to FIG. 2, the header assembly 102, when coupled to the reductant tank 104, may also include a reductant tank filter 138 coupled to the return line 134 and disposed within the reductant tank 104 to provide additional filtration of the second flow.

Referring to FIG. 4, in some embodiments, the aftertreatment system 100 includes a second inline filter 144 (e.g., reductant filter, etc.). The second inline filter 144 is coupled to the second inlet line 142 and is configured to filter the first inlet flow. The second inline filter 144 is disposed between the first splitting device 114 and the second reductant pump 146. The second inline filter 144 receives the second inlet flow from the second inlet line 142 and filters the second inlet flow before the second inlet flow reaches the second reductant pump 146. The second inline filter 144 may inhibit or prevent the transmission of solids to the second reductant pump 146. In this way, the second inline filter 144 may facilitate prolonged desirable operation of the second reductant pump 146.

In some embodiments, the aftertreatment system 100 includes a heating system (e.g., an electric heater, a coolant circulator, etc.). As seen in FIGS. 3 and 4, in some embodiments, the heating system is a coolant circulation system 154. The coolant circulation system 154 is configured to deliver heated coolant from the engine to the reductant tank 104 and to facilitate heat transfer from the coolant to the header 110 to thaw components of the header assembly 102.

For example, in some embodiments, the first splitting device 114 is directly connected to the suction port 112 and the second splitting device 130 is directly connected to the return port 136. Similarly, in other embodiments, the first splitting device 114 and the second splitting device 130 are located in the header 110. Further, in other embodiments, the coolant circulation system 154 is configured such that each of the first distance L1 between the header 110 and the first splitting device 114 and the second distance L2 between the header 110 and the second splitting device 130 is approximately in a range of 10 millimeters (mm) to 100 mm, inclusive (e.g., 7.5 mm, 10 mm, 15 mm, 25 mm, 75 mm, 95 mm, 100 mm, 105 mm, etc.). Preferably, the first distance L1 and the second distance L2 are approximately in a range of 25 mm to 75 mm, inclusive (e.g., 20 mm, 25 mm, 30 mm, 50 mm, 70 mm, 75 mm, 80 mm, etc.). In this way, the first splitting device 114 and the second splitting device 130 are in close proximity to the coolant circulation system 154 to facilitate heat transfer to and thaw the first splitting device 114 and the second splitting device 130.

In some embodiments, the coolant circulation system 154 includes a coolant line 156 (e.g., pipe, line, etc.). The coolant line 156 is coupled to the header 110 and directs coolant to and from the header 110. The coolant line 156 includes a coolant inlet portion 158 (e.g., pipe, line, etc.). The coolant inlet portion 158 is configured to direct coolant from the engine to the reductant tank 104. As the coolant flows downstream from the engine to the reductant tank 104, the coolant passes through a coolant control valve 160 (e.g., reductant tank heating valve, etc.). The coolant control valve 160 is coupled to the coolant inlet portion 158 and is configured to regulate the flow of coolant through the coolant inlet portion 158. In this way, the coolant control valve 160 provides coolant to the header assembly 102 only when thawing is necessary. The coolant circulation system 154 also includes a coolant inlet connector 162 (e.g. pipe, line, etc.). The coolant inlet connector 162 is coupled to the coolant inlet portion 158 and the header 110. In this way, the coolant inlet portion 158 is coupled to the header 110. In some embodiments, the coolant inlet connector 162 may loop through or around the header 110 to facilitate heat transfer between the header 110, the first splitting device 114, and the second splitting device 130. The coolant inlet connector 162 may also extend down into the reductant tank 104 to further facilitate heat transfer.

In some embodiments, the coolant circulation system 154 includes a coolant outlet connector 164 (e.g., pipe, line, etc.). The coolant outlet connector 164 is coupled to the header 110 and receives the coolant from the coolant inlet connector 162. The coolant circulation system 154 also includes a coolant outlet portion 166 (e.g., pipe, line, etc.). The coolant outlet portion 166 is configured to direct the coolant away from the reductant tank 104. The coolant outlet portion 166 is coupled to the coolant outlet connector 164 and receives the coolant from the coolant outlet connector 164 to direct the coolant downstream.

In some embodiments, the coolant outlet portion 166 splits into a first coolant outlet portion 168 (e.g., pipe, line, etc.). The first coolant outlet portion 168 is coupled to the first reductant pump 122. In some embodiments, coolant from the first coolant outlet portion 168 cools the first reductant pump 122. The coolant outlet portion 166 also splits into a second coolant outlet portion 170 (e.g., pipe, line, etc.). The second coolant outlet portion 170 is coupled to the second reductant pump 146. In some embodiments, coolant from the second coolant outlet portion 170 cools the second reductant pump 146. After the coolant passes through the first reductant pump 122, the coolant continues downstream through the first coolant outlet portion 168. After the coolant passes through the second reductant pump 146, the coolant continues downstream through the second coolant outlet portion 170. The coolant outlet portion 166 also includes a coolant return portion 172 (e.g., pipe, line, etc.). The coolant return portion 172 is coupled to the first coolant outlet portion 168 and the second coolant outlet portion 170 and is configured to merge the coolant in the first coolant outlet portion 168 and the second coolant outlet portion 170. After merging the coolant in the first coolant outlet portion 168 and the second coolant outlet portion 170, the coolant return portion 172 directs the coolant back to the engine.

III. Example Method of Using a Reductant Tank Assembly to Insert Reductant

Figure 5:
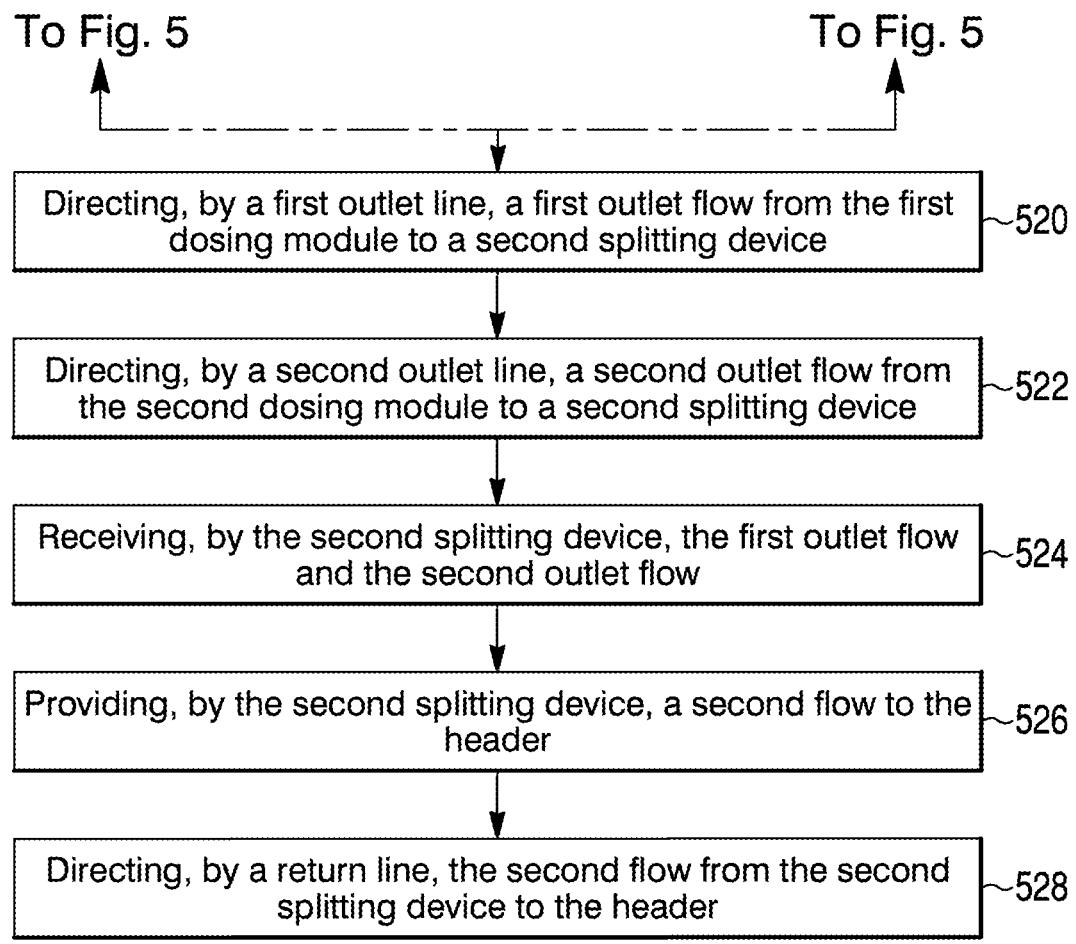
FIG. 5 is a flowchart illustrating a method of using a header assembly for an aftertreatment system, according to an exemplary embodiment of the invention.

FIG. 5 illustrates method 500 (e.g., process, etc.) of using a reductant tank assembly 105 to insert reductant to treat an exhaust gas. The method 500 may be performed by, including but not limited to, the original equipment manufacturer (i.e., when the aftertreatment system 100 is assembled, etc.) or a service technician (e.g., a mechanic, line worker, robot, automated machine, etc.).

The method 500 begins in step 502 with directing, by the suction line 106, the first flow from the header 110 to the first splitting device 114. As a result, the first flow of reductant flows from the reductant tank 104 through the header 110 via the suction line 106 to the first splitting device 114.

The method 500 continues in step 504 by receiving, by the first splitting device 114, the first flow from the header 110.

The method 500 continues in step 506 by splitting, by the first splitting device 114, the first flow into the first inlet flow and the second inlet flow. As a result, the aftertreatment system 100 may include both the first dosing module 124 and the second dosing module 148 with the single header 110 coupled to the reductant tank 104.

The method 500 continues in step 508 by directing, by the first inlet line 118, the first inlet flow from the first splitting device 114 to the first dosing module 124.

The method 500 continues in step 510 by directing, by the second inlet line 142, the second inlet flow from the first splitting device 114 to the second dosing module 148.

The method 500 continues in step 512 by filtering, by the first inline filter 120, the first inlet flow between the first splitting device 114 and the first dosing module 124. As a result, the first inlet flow is filtered before reaching the first reductant pump 122, which may inhibit or prevent the transmission of solids to the internal components of the first reductant pump 122.

The method 500 continues in step 514 by filtering, by the second inline filter 144, the second inlet flow between the first splitting device 114 and the second dosing module 148. As a result, the second inlet flow is filtered before reaching the second reductant pump 146, which may inhibit or prevent the transmission of solids to the internal components of the second reductant pump 146.

The method 500 continues in step 516 by pumping, by the first reductant pump 122, the first inlet flow from the first splitting device 114 to the first dosing module 124. As a result, the first inlet flow may be pressurized before reaching the first dosing module 124 to treat the exhaust gas.

The method 500 continues in step 518 by pumping, by the second reductant pump 146, the second inlet flow from the first splitting device 114 to the second dosing module 148.

As a result, the second inlet flow may be pressurized before reaching the second dosing module 148 to treat the exhaust gas.

The method 500 continues in step 520 by directing, by the first outlet line 128, the first outlet flow from the first dosing module 124 to the second splitting device 130. As a result, after treating the exhaust gas, the first outlet flow can be returned to the reductant tank 104.

The method 500 continues in step 522 by directing, by the second outlet line 152, the second outlet flow from the second dosing module 148 to the second splitting device 130. As a result, after treating the exhaust gas, the second outlet flow can be returned to the reductant tank 104.

The method 500 continues in step 524 by receiving, by the second splitting device 130, the first outlet flow and the second outlet flow. By receiving the first outlet flow and the second outlet flow, the second splitting device 130 is able to merge the first outlet flow and the second outlet flow into the second flow.

The method 500 continues in step 526 by providing, by the second splitting device 130, the second flow to the header 110.

The method 500 continues in step 528 by directing, by the return line 134, the second flow from the second splitting device 130 to the header 110. As a result, the second flow is returned to the reductant tank 104.

In some embodiments, the steps 508, 512, 516, and 520 may be performed before, simultaneously with, or after the steps 510, 514, 518 and 522. As a result, the first inlet flow and the first outlet flow may flow through the reductant tank assembly 105 of the aftertreatment system 100 before, simultaneously with, or after the second inlet flow and the second outlet flow.

IV. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "fluidly coupled to" and the like, as used herein, mean the two components or objects have a pathway formed between the two components or objects in which a fluid, such as air, reductant, an air-reductant mixture, exhaust gas, hydrocarbon, an air-hydrocarbon mixture, may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated

What is claimed is:

1. A header assembly for an aftertreatment system, the header assembly comprising:
a header configured to be directly attached to a wall of a reductant tank, the header comprising:
a suction port extending through the header from a first surface of the header on a reductant tank side to a second surface of the header opposite the first surface, and
a return port extending through the header from the first surface of the header to the second surface of the header;

a first splitting device configured to receive a first flow of reductant from the suction port of the header and to split the first flow into a first inlet flow and a second inlet flow;

a second splitting device configured to receive a first outlet flow and a second outlet flow and to provide a second flow to the return port of the header;

a first inlet line coupled to the first splitting device and configured to direct the first inlet flow from the first splitting device to a first dosing module;

a second inlet line coupled to the first splitting device and configured to direct the second inlet flow from the first splitting device to a second dosing module;

a first outlet line coupled to the second splitting device and configured to direct the first outlet flow from the first dosing module to the second splitting device; and a second outlet line coupled to the second splitting device and configured to direct the second outlet flow from the second dosing module to the second splitting device.

2. The header assembly of claim 1, further comprising a suction line coupled to the suction port and the first splitting device and configured to direct the first flow from the header to the first splitting device.

3. The header assembly of claim 2, further comprising a return line coupled to the return port and the second splitting device and configured to direct the second flow from the second splitting device to the header.

4. The header assembly of claim 1, further comprising:
a first inline filter coupled to the first inlet line and configured to filter the first inlet flow; and
a second inline filter coupled to the second inlet line and configured to filter the second inlet flow.

5. The header assembly of claim 1, further comprising a heating system configured to heat the header.

6. The header assembly of claim 5, wherein the heating system comprises a coolant circulation system, the coolant circulation system comprising:
a coolant line coupled to the header.

7. The header assembly of claim 5, wherein the heating system comprises an electric heater.

8. The header assembly of claim 5, wherein the first splitting device is directly connected to the suction port and the second splitting device is directly connected to the return port.

9. The header assembly of claim 5, wherein the first splitting device and the second splitting device are located in the header.

10. The header assembly of claim 5, wherein each of a first distance between the header and the first splitting device and a second distance between the header and the second splitting device are in a range of 10 millimeters to 100 millimeters, inclusive.

* * * * *